(12) United States Patent
Chung

(10) Patent No.: US 6,712,203 B2
(45) Date of Patent: Mar. 30, 2004

(54) COMPACT DISC CASE

(76) Inventor: Geal Hyub Chung, 3642 Claridge Ct., Simi Valley, CA (US) 93063

( * ) Notice: Subject to any disclaimer, the term of this patent is extended or adjusted under 35 U.S.C. 154(b) by 12 days.

(21) Appl. No.: 09/967,866

(22) Filed: Sep. 28, 2001

(65) Prior Publication Data

US 2003/0062276 A1 Apr. 3, 2003

(51) Int. Cl.⁷ .............................................. B65D 85/30
(52) U.S. Cl. .................... 206/308.1; 206/311; 206/312
(58) Field of Search ........................... 206/308.1, 307.1, 206/310, 311, 312, 313, 232

(56) References Cited

U.S. PATENT DOCUMENTS

| | | | |
|---|---|---|---|
| 4,138,703 A | 2/1979 | Stave et al. ................. | 360/133 |
| 4,463,849 A | 8/1984 | Prusak et al. ............... | 206/307 |
| 4,463,850 A | 8/1984 | Gorog ........................ | 206/309 |
| 5,011,010 A | 4/1991 | Francis et al. .............. | 206/307 |
| 5,360,107 A | 11/1994 | Chasin et al. ............... | 206/313 |
| 5,655,656 A | 8/1997 | Gottlieb .................... | 206/308.1 |
| 5,709,300 A | 1/1998 | Bolognia et al. ........ | 206/308.1 |
| 5,746,314 A | 5/1998 | Knutsen et al. .......... | 206/308.1 |
| 5,775,491 A | 7/1998 | Taniyama ................. | 206/308.1 |
| 6,016,909 A * | 1/2000 | Chang ........................ | 206/310 |
| 6,168,015 B1 * | 1/2001 | Shimizu .................... | 206/308.1 |
| 6,182,825 B1 | 2/2001 | Butcher ................... | 206/308.1 |
| 6,216,863 B1 | 4/2001 | Williamson et al. ..... | 206/308.1 |
| 6,283,281 B1 | 9/2001 | Pandolph et al. ........ | 206/308.1 |
| 6,283,285 B1 | 9/2001 | Ikebe et al. ................. | 206/310 |

* cited by examiner

*Primary Examiner*—Jacob K. Ackun
(74) *Attorney, Agent, or Firm*—Ladas & Parry

(57) ABSTRACT

Disclosed is a CD case. The CD case has a CD holder plate for carrying a compact disc, and a sleeve jacket. The CD holder plate has a body and a title bar which is integrally formed with a proximal end of the body. A distal end of the body of the CD holder plate possesses an upward curved edge portion so that the CD holder plate can be easily slid into the sleeve jacket. The CD holder plate is formed with a circular liner ridge. A bole is defined at a center of the CD holder plate inward of the circular liner ridge. Three spring brakes arc formed on an inner edge of the CD holder plate which inner edge defines the hole, in a manner such that they are spaced apart one from another in a circumferential direction. Clip pegs are respectively formed on free ends of the spring brakes to grasp the compact disc. Three guide pieces are formed on the inner edge of the CD holder plate which inner edge defines the hole, in a manner such that they are respectively opposed to the three spring brakes. A CD discharge plate has a circular plate-shaped contour and is formed with a press button at a center portion thereof. The CD discharge plate is disposed in the hole so that it operatively cooperates with the spring brakes.

14 Claims, 10 Drawing Sheets

COMPACT DISC CASE

BACKGROUND OF THE INVENTION

1. Field of the Invention

The present invention relates to a compact disc (CD) case for keeping therein a CD having an outer diameter of 120 mm, and more particularly, the present invention relates to a CD case which is composed of a CD holder plate and a sleeve jacket.

2. Description of the Related Art

A compact disc is a device employing laser beam technology, which revives data signals recorded along micro tracks on a 120 mm diameter plastic diskette, and is commonly called a CD. Philips and Sony first introduced prototypes in 1977 and 1979 and CDs as consumer products were first put on the market in 1982. CDs have improved rapidly as a reliable digital storage system for all types of data, including video images and audio signals. CDs are regarded as better than other data storage systems, due to their practicality. With a drastically increasing market share, the CD seems to be the media that will replace all others in the near future.

CDs, employing burning or stamping process, provide many practical advantages for users as well as the digital publishing industry. In spite of this advantage, the CD is difficult to separate from its protective casing, thus, it cannot be cassettized like conventional magnetic discs, and can be exposed to the risk of damage by users.

The flip-type casing was adopted from the beginning and is now standardized. Sleeve-types have been widely used for large size discs traditionally, such as LP, laser disc and so on. However, the CD, due to its small size, is difficult to store and retrieve and might be damaged if a user had to touch the data face in order to pull the CD from the sleeve. There were many attempts to produce slide-in types however, these attempts did not reduce the popularity of the flip-type storage method. Most of the attempts disclose ideas that assist the user in pulling the CD in and out, nonetheless, they often fail to consider usage, pricing, manufacturing, storing, and especially digital publishing in detail.

SUMMARY OF THE INVENTION

Accordingly, the present invention has been made in an effort to solve the problems occurring in the related art, and an object of the present invention is to provide a sleeve jacket type CD case.

Another object of the present invention is to provide a CD case assembly in which respective sleeve jacket type CD cases are book-bound using a binding strip or an adhesive tape.

Disclosed herein is a disc vehicle, also called a CD holder plate, to carry a CD into and out of a sleeve jacket. This idea should easily improve on the conventional flip-type CD casing without the drawbacks associated with the prior art. Further, the idea is furnished with various sub-ideas, which would eradicate shortcomings general sleeve-type ideas could have, also creating extra advantages that the prior art does not possess. The present disclosure pays close attention to the casing as engaged with the digital publishing process and how archiving is achieved by its unique binding way, which should open a wider market for this product.

In order to achieve the first mentioned object, according to one aspect of the present invention, there is provided a CD case comprising: a CD holder plate for carrying a compact disc; and a sleeve jacket, wherein the CD holder plate has a body and a title bar which is integrally formed with a proximal end of the body; a distal end of the body of the CD holder plate possesses an upward curved edge portion so that the CD holder plate can be easily slid into the sleeve jacket; and the CD holder plate is formed with a circular liner ridge, and CD fixing and discharging means is arranged in a hole which is defined at a center of the CD holder plate inward of the circular liner ridge.

In order to achieve the second mentioned object, according to another aspect of the present invention, there is provided a CD case assembly comprising: CD holder plates each for carrying a compact disc; sleeve jackets into which the CD holder plates can be inserted; and a binder strip having a plurality of strip segments respectively corresponding to the sleeve jackets in a manner such that the binder strip can bind the sleeve jackets into one volumetric body like booklet, each strip segment being fastened to an edge bar which is fitted into one end of each sleeve jacket, the strip segments being integrally connected one with another by linear groove connections, wherein the strip segments can be separated one from another by breaking the linear groove connections.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
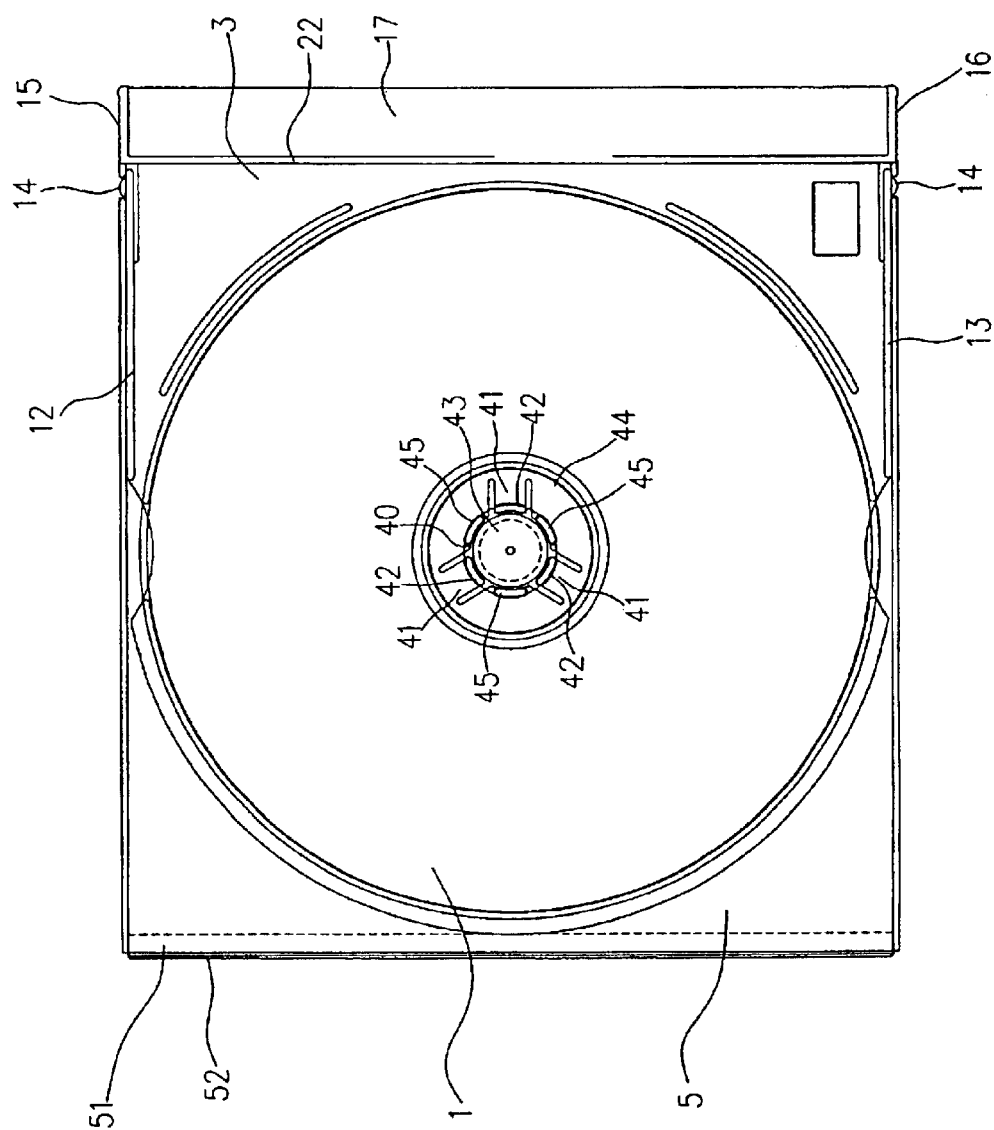
FIG. 1 is a plan view illustrating a CD case in accordance with a first embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Referring to FIG. 1, there is shown a plan view illustrating a CD case in accordance with a first embodiment of the present invention. The CD case according to the present invention comprises a CD holder plate 3 for carrying a compact disc 1, and a sleeve jacket 5.

The CD holder plate 5 of the present invention can be made of plastic as in the conventional art. In the case of storing compact discs which are used for special purposes such as long-term keeping of a data base, broadcast recording, and the like, the CD holder plate 5 can be made of metal.

The sleeve jacket 5 of the present invention can be made of any material, such as, metal, plastic, paper, etc.

Figure 2:
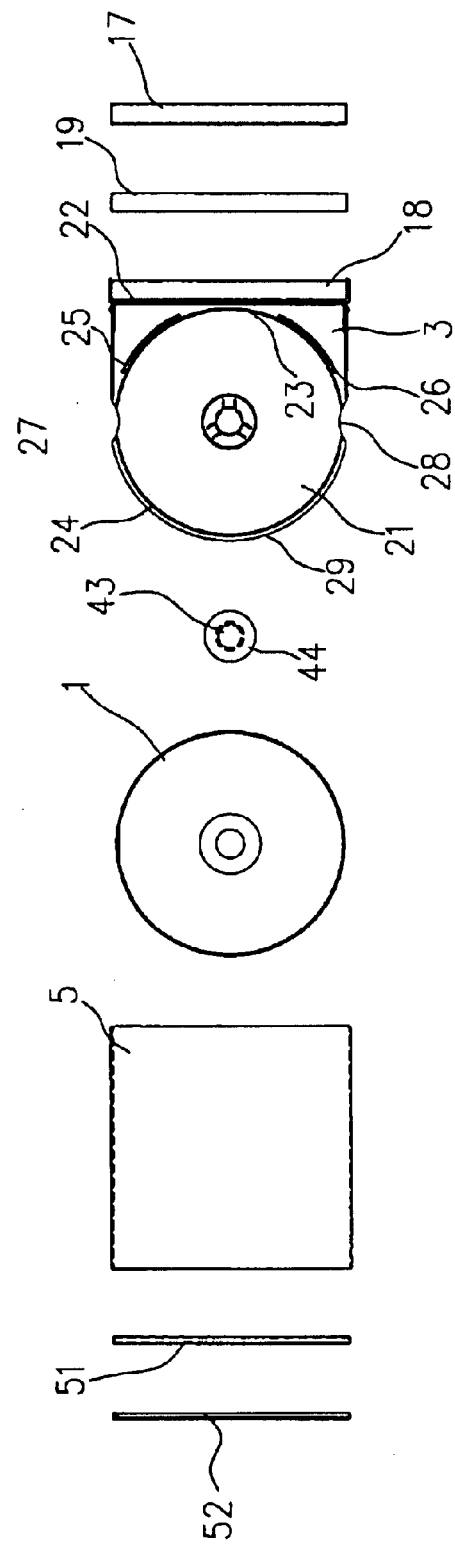
FIG. 2 is an exploded plan view illustrating a CD holder plate, a CD and a sleeve jacket.

In FIG. 2, the CD holder plate 3 and the sleeve jacket 5 are illustrated separated from each other.

The CD holder plate 3 serves as a moving body which is pushed into or pulled out of the sleeve jacket 5. The present invention adopts basic idea in which a compact disc 1 is loaded on the CD holder plate 3.

The CD holder plate 3 has a body 21 and a title bar 22 which is integrally formed with a proximal end of the body 21.

The body 21 of the CD holder plate 3 is formed with a circular liner ridge 23 on which the compact disc 1 is loaded. As can be readily seen from FIG. 3, the liner ridge 23 is raised from the body 21 to support a non-data disc area of the compact disc 1 and to separate the compact disc 1 from the body 21 of the CD holder plate 3.

The compact disc 1 has marginal portions adjacent to inner and outer edges thereof so that a central data-written area is protected. The marginal portions serve as non-data disc areas.

Referring again to FIG. 2, a distal end of the body 21 of the CD holder plate 3 is formed, outward of the circular liner ridge 23, with a semi-circular rim 24. The semi-circular rim 24 has the same height as an inner space which is defined in the sleeve jacket 5.

When the semi-circular rim 24 is inserted into the sleeve jacket 5, dust which adheres to an inner surface of the sleeve jacket 5 is forced to be discharged out of the sleeve jacket 5 by the semi-circular rim 24, whereby the compact disc 1 can be protected from dust.

The proximal end of the body 21 of the CD holder plate 3 which is connected with the title bar 22 is formed, outward of the circular liner ridge 23, with a pair of circular arc-shaped rim portions 25 and 26 which are spaced apart from each other along the circumferential direction, whereby the compact disc 1 can be retained in place by the presence of the semi-circular rim 24 and the pair of circular arc-shaped rim portions 25 and 26.

The body 21 of the CD holder plate 3 is formed, adjacent to both ends of the semi-circular rim 24 and on both side end surfaces thereof, with grooves 27 and 28 which allow the compact disc 1 to be grasped.

Figure 4:
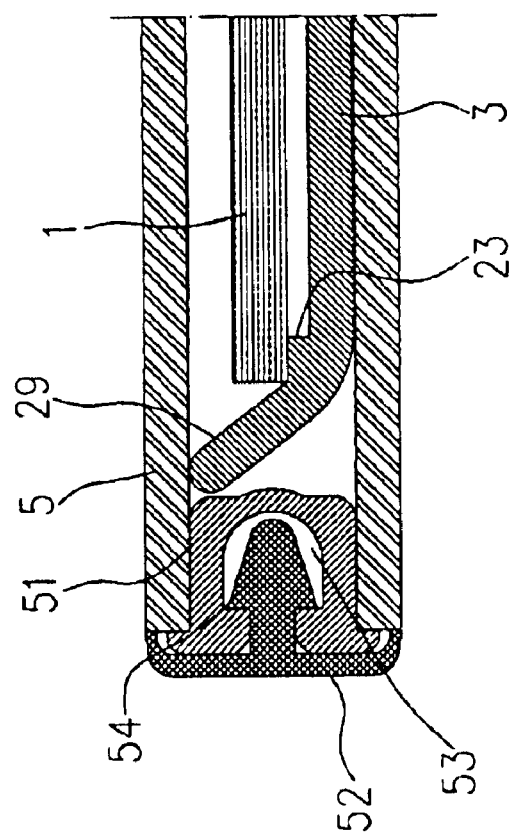
FIG. 4 is a partial cross-sectional view illustrating an upward curved edge portion of the CD holder plate and an edge bar of the sleeve jacket.
Figure 5:
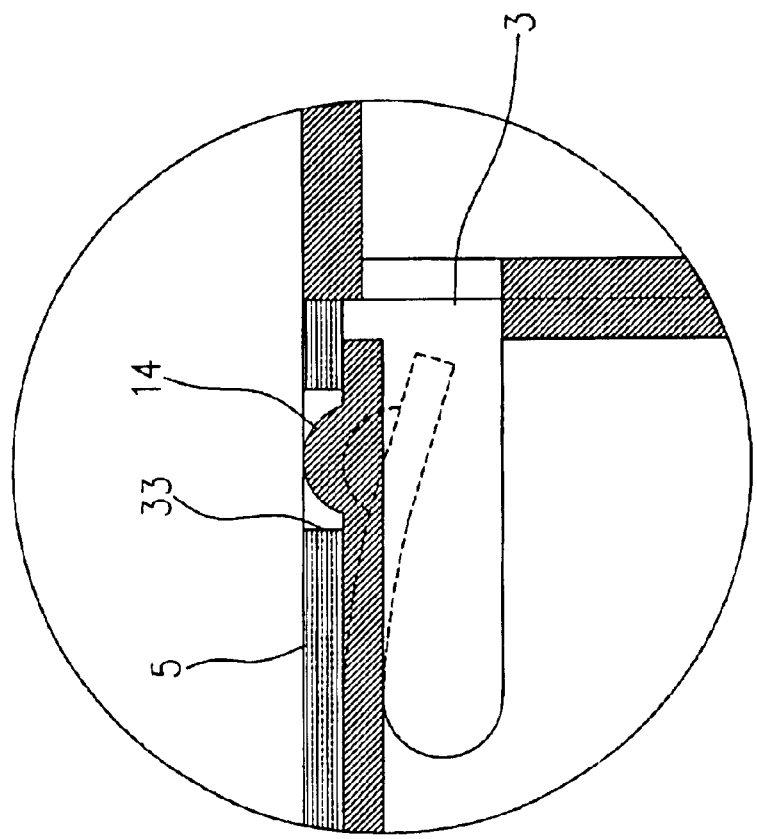
FIG. 5 is an enlarged view illustrating a guide protrusion and a stopper of the CD holder plate.

On the other hand, as best shown in FIG. 4, the distal end of the body 21 of the CD holder plate 3 possesses an upward curved edge portion 29 so that the CD holder plate 3 can be easily slid into the sleeve jacket 5.

Referring to FIG. 1, the CD holder plate 3 is formed, adjacent to the title bar 22 and both side ends thereof, with guide protrusions 12 and 13 which function to guide insertion of the CD holder plate 3 into the sleeve jacket 5.

Also, the guide protrusions 12 and 13 are formed, at one ends thereof facing the title bar 22, with stoppers 14. The stoppers 14 can be engaged into grooves 33 which are respectively defined on both side end surfaces of the sleeve jacket 5. The stoppers 14 ensure that the CD holder plate 3 is reliably supported inside the sleeve jacket 5.

In the meanwhile, it can be envisaged that, in place of the stoppers 14, a frictional agent is applied to corresponding positions in such a way as to allow the CD holder plate 3 to be reliably supported by the sleeve jacket 5 by virtue of frictional force.

Referring again to FIG. 1, both side ends of the title bar 22 are formed with finger grips 15 and 16 to allow a user to easily grasp the CD holder plate 3

A protector plate 17 is located outward of the title bar 22.

Figure 3:
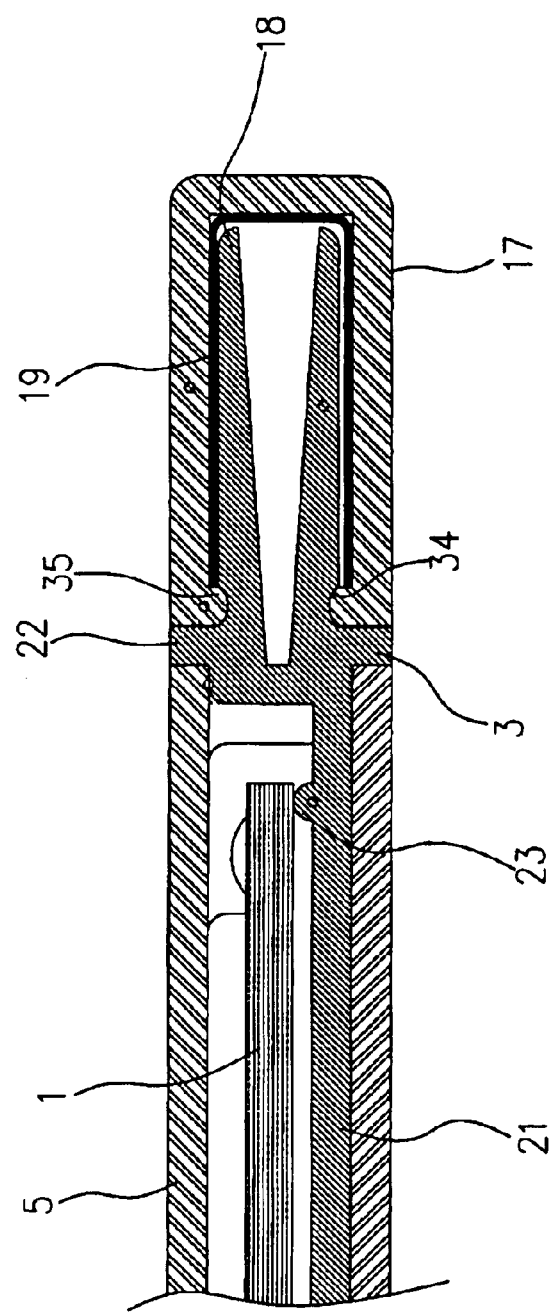
FIG. 3 is a partial cross-sectional view illustrating a structure of a title bar of the CD holder plate.

Referring to FIG. 3, it is to be noted that a printed label 19 is placed on a projecting finger 18 of the title bar 22 and the protector plate 17 is fitted over the projecting finger 18. Adjacent to the title bar 22, the projecting finger 18 is defined with recesses 34. Prominences which are formed at both ends of the protector plate 17 are snap-fitted into the recesses 34.

The protector plate 17 is made of a transparent material so that a printed surface of the label 19 can be viewed from the outside.

Referring now again to FIG. 1, CD fixing and discharging means is arranged in a hole 40 which is defined at a center of the CD holder plate 3 inward of the circular liner ridge 23.

The CD fixing and discharging means includes three spring brakes 41 which are formed on an inner edge of the CD holder plate 3 which inner edge defines the hole 40, in a manner such that they are spaced apart one from another in a circumferential direction. Clip pegs 42 are respectively formed on free ends of the spring brakes 41 for grasping the compact disc 1. Also, three guide pieces 45 are formed on the inner edge of the CD holder plate 3 which inner edge defines the hole 40, in a manner such that they are respectively opposed to the three spring brakes 41.

A CD discharge plate 44 which has a circular plate-shaped contour is formed with a press button 43 at a center portion thereof. The CD discharge plate 44 is disposed in the hole 40 so that it operatively cooperates with the spring brakes 41. The CD discharge plate 44 is defined with six circular arc-shaped openings through which the spring brakes 41 and the guide pieces 45 positioned there between pass. The circular arc-shaped openings are represented by the drawing reference numeral 46 in FIG. 6.

Figure 6:
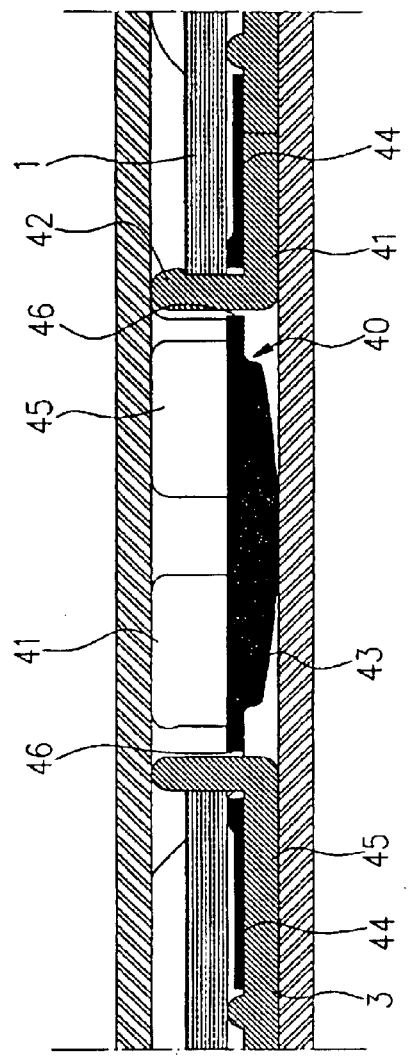
FIG. 6 is a cross-sectional view illustrating spring brakes and a press button of the CD holder plate.

Referring to FIG. 6, the CD discharge plate 44 is bonded, adjacent to a radial outer end thereof, to the CD holder plate 3 around the spring brakes 41 and the guide pieces 45, and the press button 43 projects in a direction which is opposite to the compact disc 1.

Figure 7:
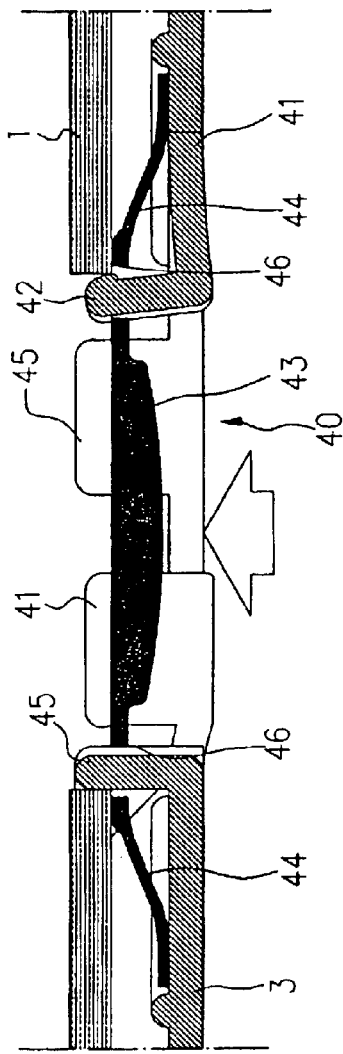
FIG. 7 is a cross-sectional view illustrating a state wherein the press button is pressed upward.

FIG. 7 is a cross-sectional view illustrating a state wherein the press button 43 is pressed upward. When viewed in FIG. 7, if the press button 43 is pressed upward in a direction in which the compact disc 1 is loaded onto the CD holder plate 3, as a center portion of the CD discharge plate 44 is moved upward, the clip pegs 42 of the spring brakes 41 which pass through the circular arc-shaped openings 46 are substantially converged inward, whereby the compact disc 1 is freed from the clip pegs 42 to be discharged out of the CD holder plate 3.

Accordingly, by positioning the CD holder plate 3 of the present invention above a CD drive so that the compact disc 1 is aligned with the CD drive and then by pressing downward the press button 43 to release the compact disc 1 from the CD holder plate 3, the compact disc 1 can be loaded onto the CD drive without causing the finger to touch the compact disc.

Figure 8:
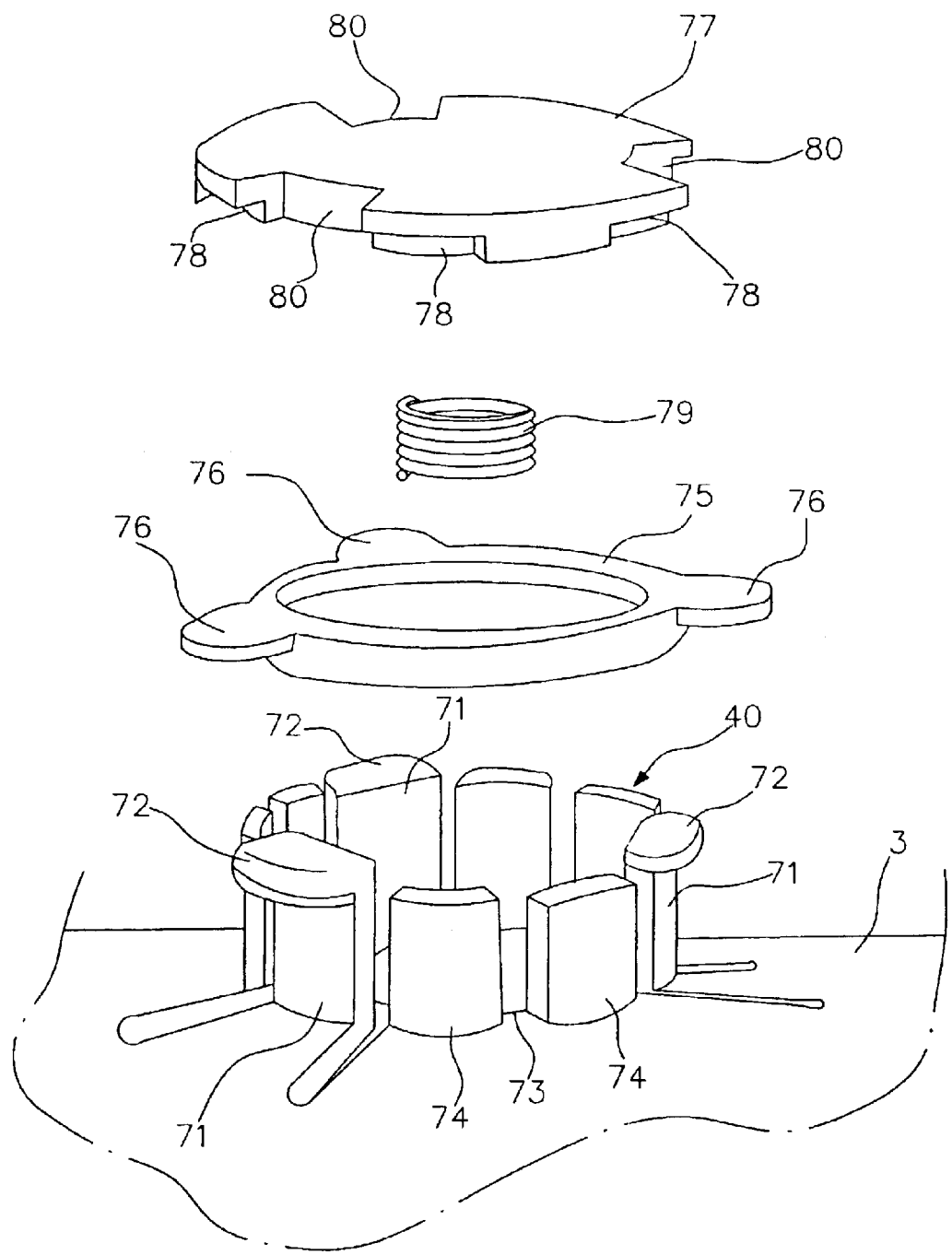
FIG. 8 is an exploded perspective view illustrating CD fixing and discharging means according to a variation of the first embodiment of the present invention.

FIG. 8 is an exploded perspective view illustrating CD fixing and discharging means according to a variation of the first embodiment of the present invention. Three spring brakes 71 are formed on the inner edge of the CD holder plate 3 which inner edge defines the hole 40, in a manner such that they are spaced apart one from another in a circumferential direction. Clip pegs 72 are respectively formed on free ends of the spring brakes 71 for grasping the compact disc.

Three pairs of vertical bars 74 are formed on the inner edge which defines the hole 40. Each pair of vertical bars 74 are formed between two adjoining spring brakes 71 in a manner such that a space 73 is defined between each pair of vertical bars 74

A press button 75 has a size which is capable of being inserted into the hole 40. The press button 75 is formed with radial protuberances 76 which are spaced apart one from another in the circumferential direction by a predetermined angle.

Each protuberance 76 is inserted into the space 73 which is defined between each pair of vertical bars 74

A plug member 77 is fixedly positioned on upper end surfaces of the vertical bars 74. The plug member 77 is defined, on a circumferential outer surface thereof, with grooves 80 in which the spring brakes 71 are respectively accommodated.

Also, the plug member 77 is defined, on the circumferential outer surface thereof, with a plurality of guide grooves 78 in which the vertical bars 74 are respectively engaged.

On the other hand, a spring 79 is interposed between the plug member 77 and the press button 75.

Figure 9:
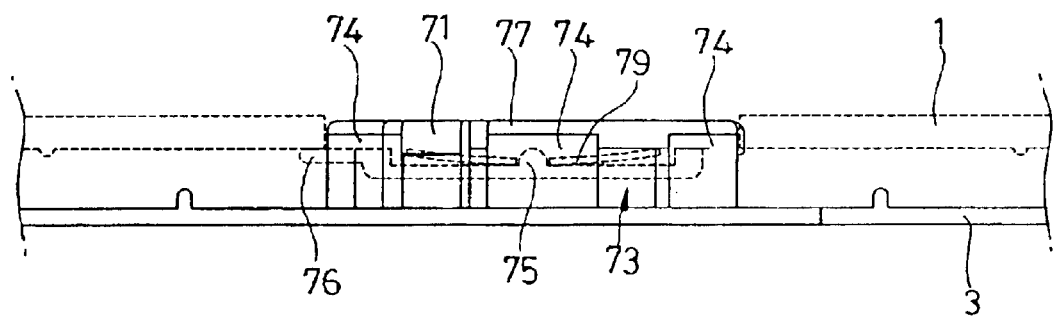
FIG. 9 is a cross-sectional view illustrating an assembled status of the CD fixing and discharging means of FIG. 8.

FIG. 9 is a cross-sectional view illustrating an assembled status of the CD fixing and discharging means of FIG. 8. The compact disc 1 is loaded onto the CD holder plate 3.

The vertical bars 74 are respectively positioned at both sides of each spring brake 71, and each protuberance 76 of the press button 75 is inserted into the space 73 which is defined between each pair of vertical bars 74.

The protuberance 76 of the press button 75 is located between the compact disc 1 and the CD holder plate 3. If the press button 75 is pressed upward, the three protuberances 76 force the compact disc 1 to move upward, whereby the compact disc 1 is freed from the spring brakes 71.

In the meanwhile, as described above, the plug member 77 is fixed to the upper end surfaces of the vertical bars 74. And, the spring 79 is interposed between the plug member 77 and the press button 75 to apply returning force to the press button 75.

While the spring 79 is used in this embodiment, the spring 79 can be replaced with an equivalent such as sponge and the like.

The sleeve jacket 6 of the present invention can be manufactured in a manner such that it has a shape of a rectangular tube which is closed at one end thereof or opened at both ends thereof.

Referring again to FIG. 1, the sleeve jacket 5 has a shape of a rectangular tube which is opened at both ends thereof. An edge bar 51 is fitted into one end of the sleeve jacket 5 which is to be closed. Referring to FIG. 4, an outer surface of the edge bar 51 is defined with a depression 53, and a locking wedge 54 of a binder strip 52 is locked into the depression 53 to finish the close end of the sleeve jacket 5.

Figure 10:
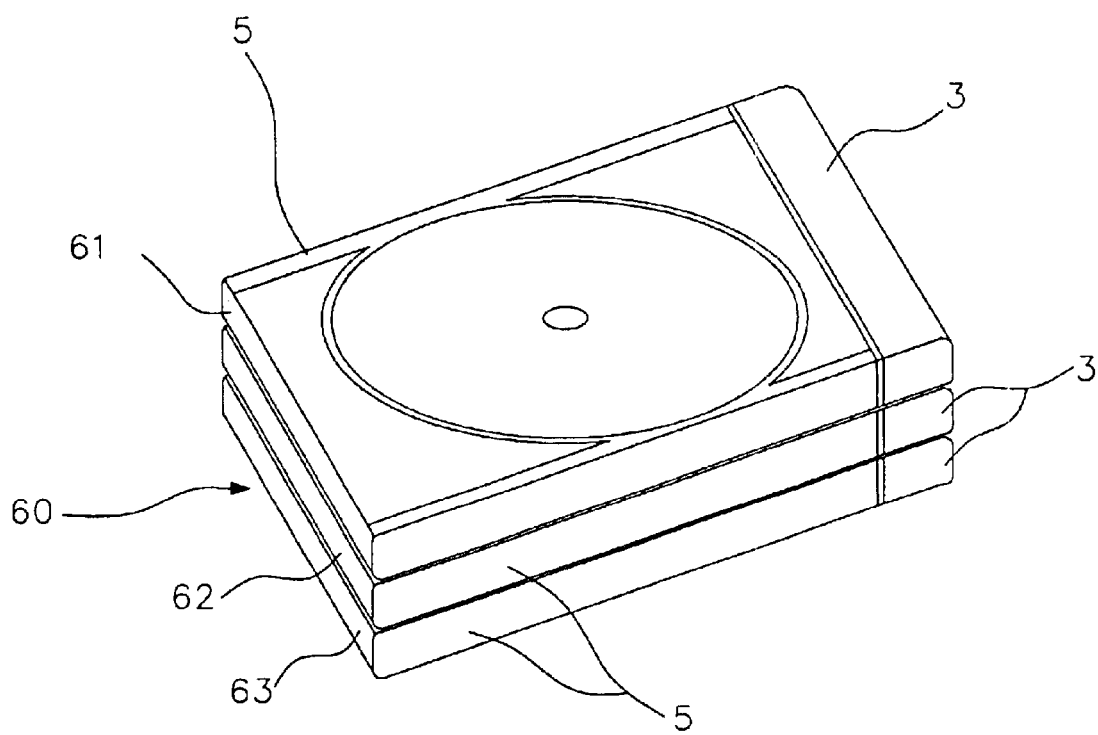
FIG. 10 is a perspective view illustrating a CD case assembly in accordance with a second embodiment of the present invention.

FIG. 10 is a perspective view illustrating a CD case assembly in accordance with a second embodiment of the present invention. In this embodiment, the binder strip 60 comprises three strip segments 61, 62 and 63.

The binder strip 60 provides advantages in that it can bind the sleeve jackets 5 into one volumetric body like booklet.

Each of the strip segments 61, 62 and 63 is fastened to an edge bar 51 which is fitted into one end of each sleeve jacket 5. The CD holder plate 3 which is as aforementioned above in association with the first embodiment is inserted into each sleeve jacket 5.

Figure 11:
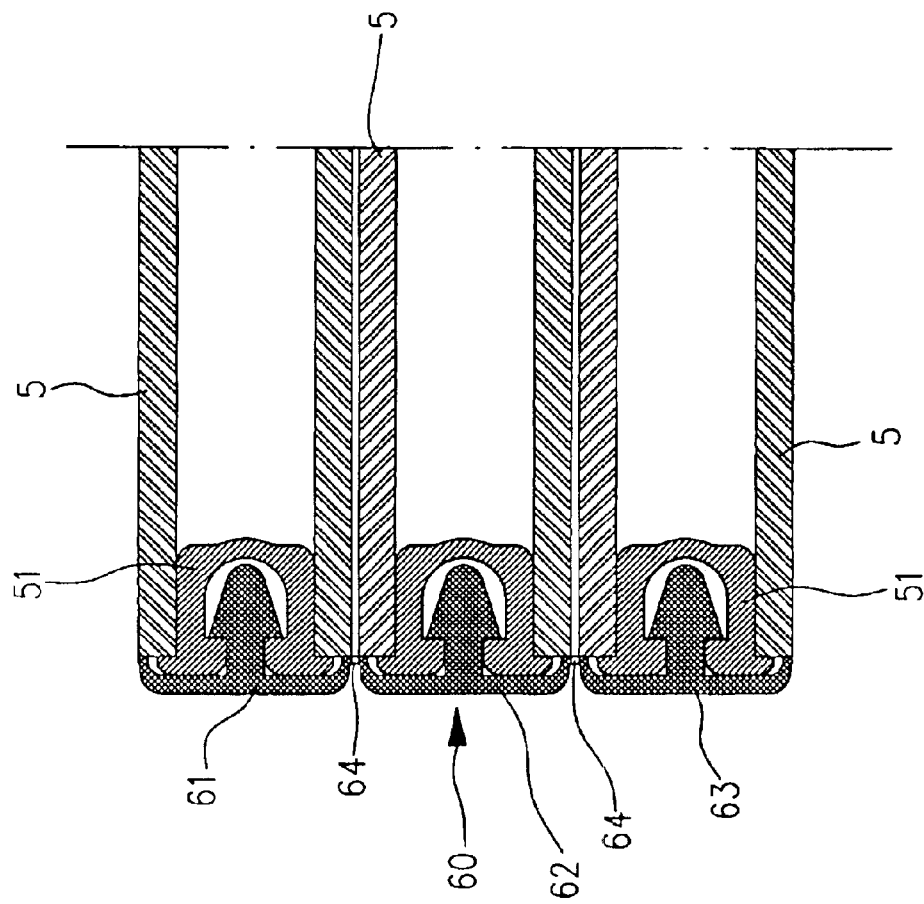
FIG. 11 is a partial cross-sectional view illustrating a binder strip of the CD case assembly of FIG. 10.

FIG. 11 is a partial cross-sectional view illustrating a binder strip of the CD case assembly of FIG. 10. The strip segments 61, 62 and 63 of the binder strip 60 are integrally connected one with another by linear groove connections 64.

The binder strip 60 of the present invention is used in the form of a bookbinder by binding together the sleeve jackets 5, whereby it is possible to store several compact discs all together. As a consequence, upon packaging CD cases for sale, 20 to 30 compact discs can be bound into one volumetric body.

The present embodiment further provides an advantage in that compact cases can be stored in a shelf like books.

By breaking the linear groove connections 64, the strip segments 61, 62 and 63 can be separately provided as in the case of the first embodiment of the present invention.

While the binder strip 60 is used in the above embodiment, it is to be readily understood that the CD cases of the present invention can be bound using an adhesive tape.

As fully described above, in the CD case of the present invention, since the CD holder plate is operated in a manner such that it is slid into and from the sleeve jacket, this two-dimensional slide operation would be easier and safer than three-dimensional flip operation.

Also, since the CD case of the present invention uses thin skin material such as sheet material or plastic film, a size of the CD case can be minimized.

Moreover, because the sleeve jacket of the present invention provides the printed label, the CD case of the present invention is advantageous for mass printed-skin such as paper. And, volume binding for publishing, or for storing discs, is superior, and cosmetically excellent slim look is rendered.

Further, the CD case of the present invention is functionally beneficial for archiving, storing and call slipping, practical for automated mass production and packing process, and economical in manufacturing and sales.

The most important high-light on N-type CD jacket over the conventional 'flip type' must be potential attraction for publishers, such as, software, audio CD, DVD, digital book, and more. It's binding characteristics like booklet allows additional paper page attachments for extra supplement notes, and or, for volume cover. Further, that can be stored or displayed in the ordinary bookshelves without using any other special storage systems, also find and indexing would be far more convenient than any other of it's kinds.

Moreover, slide in-and-out way or the way to pull off CD from its case is already well used to anyone—by conventional records and others. Thus, the 'N-type' can be easily taken on without any extra exercises. In addition, specially designed CD pull-off button will increase the convenience more. For some, the plate can be used in the mode of upside down to release CD instantly on the drive tray by pushing one-touch button.

Jacket face material being diverse, for instance, both ends opened simple printed paper tube would be excellent choice for serial catalogue mailing, or metal sleeve for luxury archiving such for bank accounting record, or for governmental data base. Such diverse characteristics, especially excellent for any massive CD archiving, forward adaptation as standard casing form in near future. Especially, in prospect of mass automation production, it could utilize existing systems—partially modifying existing manufacturing or packing systems, or adding or replacing some attachments, it necessary.

It is apparent that the present invention is applied to a commercial bookbinding of any cases.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A CD case comprising:
   a CD holder plate for carrying a compact disc;
   a sleeve jacket;
   a circular liner ridge formed on the CD holder plate and protruding from an upper surface of a body to support a non-data disc area of the compact disc;
   the body of the CD holder plate having,
      a title bar having side ends formed with finger grips to allow a user to grasp the CD holder plate, the title bar integrally formed with a first end of the body, the first end of the body being formed outward of the circular liner ridge with a pair of circular arc-shaped rim portions spaced apart from each other along a circumferential direction, the compact disc being retained in place by the presence of a semi-circular rim and the pair of circular arc-shaped rim portions, and
      an upward curved edge portion of the body disposed on a second end of the body outward of the circular liner ridge and the semi-circular rim;
   guide protrusions formed on the CD holder plate, the guide protrusions having an end facing the title bar and stoppers engageable into grooves defined on both side end surfaces of the sleeve jacket; and
   CD fixing and discharging means arranged in a hole which is defined at a center of the CD holder plate inward of the circular liner ridge.

2. The CD case as claimed in claim 1, wherein the CD fixing and discharging means comprises:
   three spring brakes formed on an inner edge of the CD holder plate which inner edge defines the hole, in a manner such that they are spaced apart one from another in a circumferential direction;
   clip pegs respectively formed on free ends of the spring brakes for grasping the compact disc;
   three guide pieces formed on the inner edge of the CD holder plate which inner edge defines the hole, in a manner such that they are respectively opposed to the three spring brakes; and
   a CD discharge plate having a circular plate-shaped contour and formed with a press button at a center portion thereof, the CD discharge plate being disposed in the hole so that it operatively cooperates with the spring brakes.

3. The CD case as claimed in claim 1, wherein the CD fixing and discharging means comprises:
   three spring brakes formed on an inner edge of the CD holder plate which inner edge defines the hole, in a manner such that they are spaced apart one from another in a circumferential direction;
   clip pegs respectively formed on free ends of the spring brakes for grasping the compact disc;
   three pairs of vertical bars each pair formed between two adjoining spring brakes in a manner such that a space is defined between each pair of vertical bars;
   a press button having a size capable of being inserted into the hole and formed with radial protuberances which are spaced apart one from another in a circumferential direction by a predetermined angle and each of which is inserted into the space defined between each pair of vertical bars;
   a plug member fixedly positioned on upper end surfaces of the vertical bars and defined, on a circumferential outer surface thereof, with grooves in which the spring brakes are respectively accommodated and a plurality of guide grooves in which the vertical bars are respectively engaged; and
   a spring interposed between the plug member and the press button.

4. The CD case as claimed in claim 3, wherein the rim has the same height as an inner space which is defined in the sleeve jacket, and, when the semi-circular rim is inserted into the sleeve jacket, dust which adheres to an inner surface of the sleeve jacket is forced to be discharged out of the sleeve jacket by the rim, whereby the compact disc can be protected from dust.

5. The CD case as claimed in claim 3, wherein the body of the CD holder plate is formed, adjacent to both ends of the semi-circular rim and on both side end surfaces, with grooves where the compact disc can be grasped.

6. The CD case as claimed in claim 1, further comprising:
   a printed label attached to a projecting finger of the title bar; and
   a protector plate fitted over the projecting finger.

7. The CD case as claimed in claim 1, further comprising:
   the sleeve jacket having a shape of a rectangular tube, which is opened at both ends thereof;
   an edge bar fitted into one end of the sleeve jacket which is to be closed;
   an outer surface of the edge bar defined with a depression; and
   a locking wedge of a binder strip locked into the depression to finish the close end of the sleeve jacket.

8. A CD case assembly comprising:
   CD holder plates each for carrying a compact disc;
   sleeve jackets into which the CD holder plates can be inserted; and
   a binder strip having a plurality of strip segments respectively corresponding to the sleeve jackets in a manner such that the binder strip can bind the sleeve jackets into one volumetric body like booklet, each strip segment being fastened to an edge bar which is fitted into one end of each sleeve jacket, the strip segments being integrally connected one with another by linear groove connections.

9. The CD case as claimed in claim 8, wherein the strip segments can be separated one from another by breaking the linear groove connections.

10. A data disk case comprising:
    a data disk holder plate for carrying a data disk;
    a sleeve jacket;
    a circular liner ridge formed on the data disk holder plate and protruding from an upper surface of a body to support a non-data disc area of the data disk;
    the body of the data disk holder plate having,
       a title bar having side ends formed with finger grips to allow a user to grasp the data disk holder plate, the title bar integrally formed with a first end of the body, the first end of the body being formed outward of the circular liner ridge with at least one circular arc-shaped rim portion disposed along a circumferential direction, the data disk being retained in place by the presence of a semi-circular rim and the at least one circular arc-shaped rim portion, and an upward curved edge portion of the body disposed on a second end of the body outward of the circular liner ridge and the semi-circular rim;

guide protrusions formed on the data disk holder plate, the guide protrusions having an end facing the title bar and stoppers engageable into grooves defined on both side end surfaces of the sleeve jacket; and data disk fixing and discharging means arranged in a hole which is defined at a center of the data disk holder plate inward of the circular liner ridge.

11. The data disk case of claim 10, wherein the data disk comprises a CD.

12. The data disk case of claim 10, wherein the data disk comprises a DVD.

13. The data disk case of claim 10, wherein the data disk comprises a VCD.

14. The data disk case of claim 10, wherein the data disk is an optical disk.

* * * * *